United States Patent [19]

Busch

[11] 4,116,648
[45] Sep. 26, 1978

[54] MULTI-LAYER FILTER DUST BAG FOR A VACUUM CLEANER

[75] Inventor: Charles R. Busch, Mishawaka, Ind.

[73] Assignee: Aktiebolaget Electrolux, Stockholm, Sweden

[21] Appl. No.: 736,147

[22] Filed: Oct. 27, 1976

[51] Int. Cl.² .............................................. B01D 46/00
[52] U.S. Cl. ....................................... 55/276; 55/369;
55/376; 55/380; 55/382; 55/473; 55/524;
55/487; 55/527
[58] Field of Search .................................. 55/368–372,
55/375–377, 380–382, 527, 276, 524, 473, 487

[56] References Cited

U.S. PATENT DOCUMENTS

| 754,053 | 3/1904 | Derham | 55/382 |
|---|---|---|---|
| 1,821,824 | 9/1931 | Woodward | 55/382 |
| 2,188,428 | 1/1940 | Evans | 55/380 |
| 2,780,828 | 2/1957 | Brace | 55/374 |
| 2,964,127 | 12/1960 | Kern | 55/382 |
| 3,322,041 | 5/1967 | Fesco | 55/376 |
| 3,364,663 | 1/1968 | Lagerstrom | 55/380 |
| 3,596,441 | 8/1971 | Lundahl | 55/376 |
| 3,710,948 | 1/1973 | Sexton | 55/382 |
| 3,859,064 | 1/1975 | Cordell | 55/382 |
| 3,972,694 | 8/1976 | Head | 55/97 |

FOREIGN PATENT DOCUMENTS 527,228  10/1940  United Kingdom .................... 55/381

*Primary Examiner*—Bernard Nozick
*Attorney, Agent, or Firm*—Alfred E. Miller

[57] ABSTRACT

A vacuum cleaner dust bag that is constructed to substantially increase the filtering action of the bag and therefore is particularly adaptable for use in vacuum cleaners utilized in hospitals, nursing homes, and other health care facilities. The filter dust bag is constituted of two concentric sections or compartments with the space of one of the compartments having a dry filter mat material that effectively traps all dust and dirt particles down to minute particles of about 0.3 microns. The tube on the filter dust bag which connects to the discharge outlet of the vacuum cleaner is constructed of an air-impervious material, while the outer and inner layers of the filter are fabricated of air-pervious material of different elasticity.

9 Claims, 5 Drawing Figures

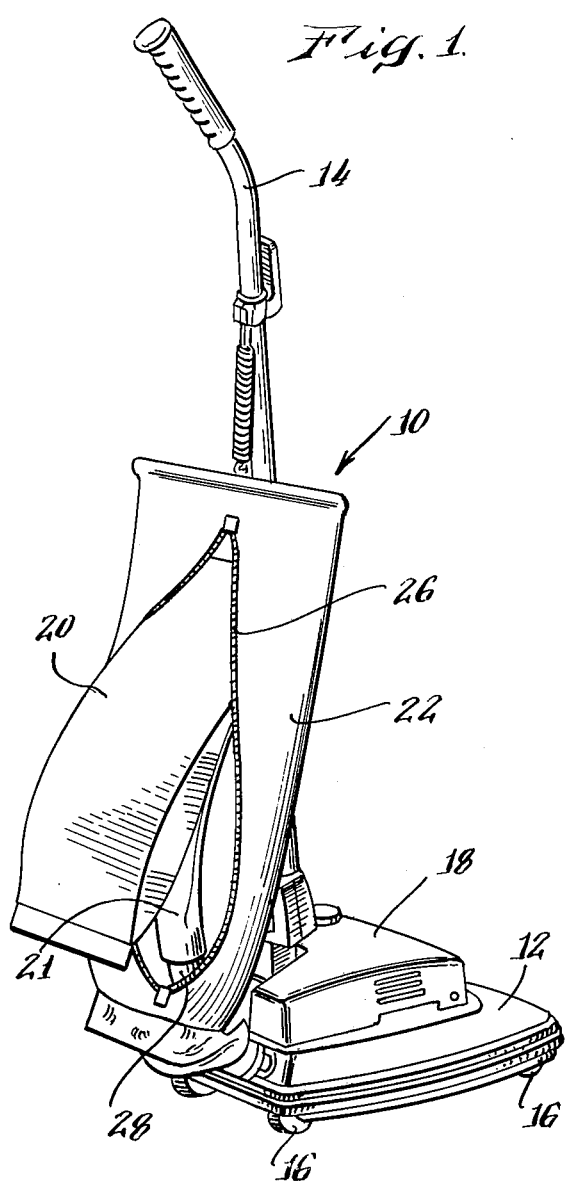
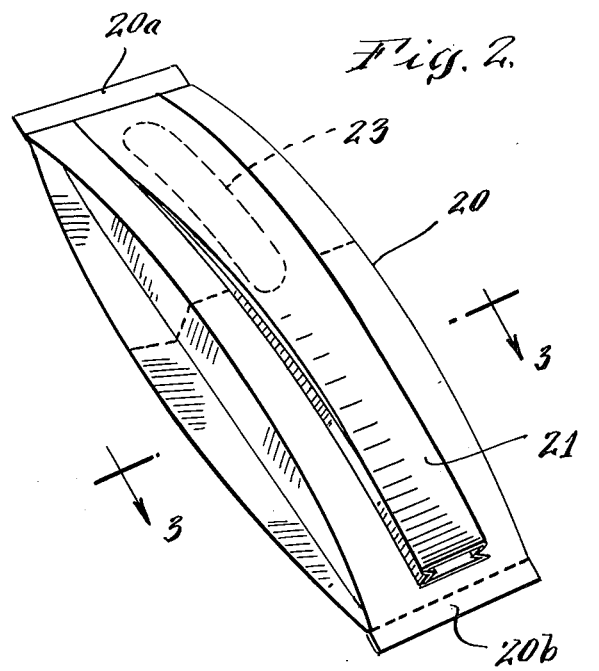
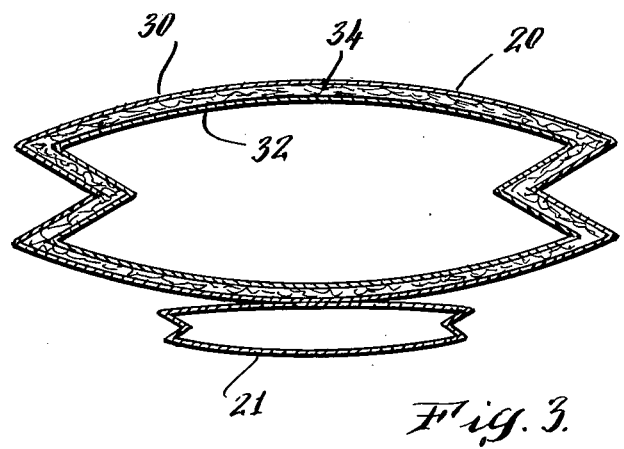
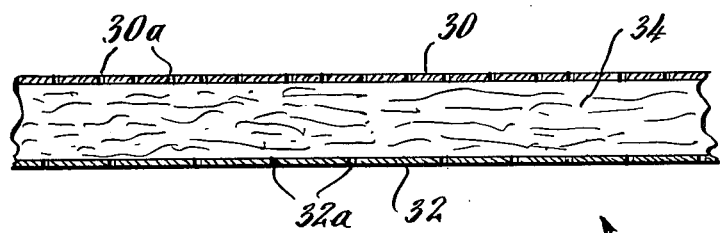
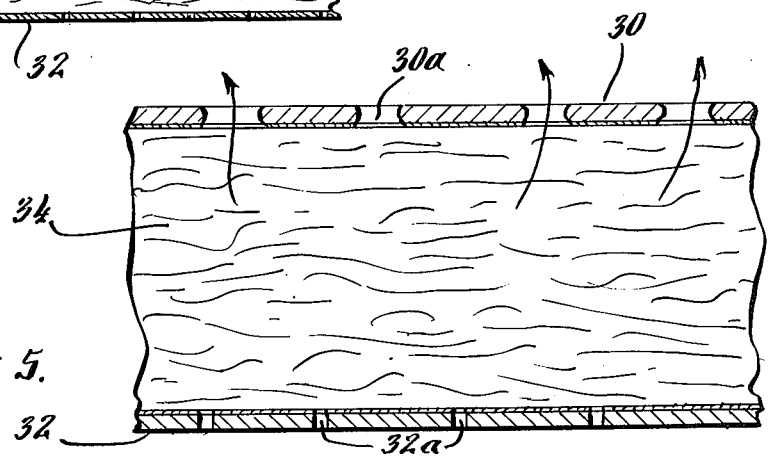

MULTI-LAYER FILTER DUST BAG FOR A VACUUM CLEANER

BACKGROUND OF THE INVENTION

It is well known that it is desirable to provide hospitals, nursing homes, or the like, with a cleaning machine which not only picks up dust and dirt but also does not redistribute dirt particles and undesired bacteria back into the room being cleaned to thereby contaminate the air therein. Thus, sanitary conditions in a hospital are of paramount consideration. Heretofore, a number of vacuum cleaning machines and methods have been used in hospitals or the like for removing minute dirt and dust particles from air streams, however, these machines and methods have resulted in something less than the order of 99% of arresting of these particles in the filter bag. In the alternative, if the desirable trapping of particles is achieved, the air flow rate within the cleaning machine was so low as to be impractical. One arrangement has been proposed in U.S. Pat. No. 3,971,643 to Hufton, having an air-impervious outer bag, and a conventional inner paper dust bag. The outer dust bag is provided with an opening in which a rectangular-shaped filter is removably inserted. This arrangement does not have the filtering capabilities of the present design besides being more costly and complicated to manufacture.

The present invention relates to a filter dust bag for a vacuum cleaner apparatus which effectively removes minute particles of dust and dirt from a moving stream of air.

It is an object of the present invention to provide a multi-layer filter dust bag that removes minute particles from a high velocity air stream.

It is another object of the present invention to provide an apparatus including a dust bag for efficiently picking up dirt and dust without discharging bacteria or other undesired matter into the air of a room that has been cleaned.

It is a further object of the present invention to provide a multi-layered filter dust bag having a fibrous intermediate air-pervious filter element.

It is still another object of the present invention having spaced inner and outer compartments of the filter bag that are constituted of air-pervious material of the same or different permeability rates.

It is a further object of the present invention to provide a multi-layer filter dust bag that can be substituted for the conventional filter bag currently being used in upright vacuum cleaners for cleaning hospitals or the like.

It is still another object of the present invention to provide an inner multi-layer filter bag for upright vacuum cleaners that insures substantially total filtration of the discharged air through the inner filter bag.

It is yet another object of the present invention in which the dust collecting and filtering elements of the bag are installed in the vacuum cleaning apparatus as a single unit and removed simultaneously.

A further object of the present invention is to provide a multi-layered filter dust bag which is safely contained within an air-pervious outer bag having a closable access opening. The dust bag is disposable after the dirt collection capacity has been reached.

Another object of the present invention is to provide a filter dust bag that results in the reduction of the noise level in the vacuum cleaning apparatus.

In order that the invention will be more clearly understood, it will now be disclosed in greater detail with reference to the accompanying drawings, in which:

FIG. 1 is a perspective view of a vacuum cleaning apparatus utilizing the improved multi-layer dust bag of my invention, and showing the dust bag partially removed from the access opening in the outer air-impervious dust bag;

FIG. 2 is a perspective view of the multi-layer filter dust bag apart from the vacuum cleaning apparatus;

FIG. 3 is a section 3—3 taken along the lines 3—3 of FIG. 2;

FIG. 4 is a cross-sectional view section of the filter dust bag constructed in accordance with the teachings of my invention; and FIG. 5 is a partial enlarged cross-sectional view of the filter dust bag shown in FIG. 4 with exaggerated openings in the outer, more elastic layer thereof.

DESCRIPTION OF THE PREFERRED EMBODIMENT

Referring to FIG. 1, a conventional upright vacuum cleaner is shown which is referred to generally by the numeral 10. The vacuum cleaner comprises a base 12 and a generally vertically disposed handle 14. Supported on the undersurface of the base 12 are a plurality of wheels 16 which facilitate the movement of the vacuum cleaner 10 over the surface to be cleaned. As is usual, a motor driven fan (not shown) is mounted within the housing 18 on the base 12. The fan when operating within the housing 18 provides the vacuum necessary for picking up dust and dirt from the surface to be cleaned, such as a rug or carpet.

The multi-layer filter bag 20 is shown in FIG. 1 partially removed from the vacuum cleaner 10, and is constructed in accordance with the teachings of my invention. It will be noted that the filter bag 20 is positioned within an outer dust bag 22 which may be fabricated from a perforated vinyl or cloth. A rear opening 24 is shown in the outer dust bag through which the inner filter bag 20 may be inserted or removed, said rear opening being capable of being opened and closed by means of a zipper fastener 26. An elongated tube 21 constructed of an air-impervious material connects the multi-layer filter bag 20 to the discharge outlet 28 of the vacuum cleaner. Thus, it should be apparent that air being discharged from the motor driven fan is directed to the interior of the inner filter bag 20.

As seen in FIGS. 2 and 3, the inner multi-layer filter bag 20 is generally elliptical-shaped with closed and sealed ends 20a and 20b. The air-impervious tube is open at one end 21a and communicates with the elongated hole 23 in the inner filter bag 20.

As seen in FIG. 3 a layer of filtering material 34 is shown between the outer sheet 30 of air-pervious material and the inner sheet 32 of air-pervious material. Sheets 30 and 32 have apertures 30a and 32a respectively. It should be noted that it is within the scope of the present invention to provide outer and inner sheet of air-pervious material having the same or different permeability rates. The intermediate material is in the form of a batt being approximately ⅜ inch thick and constructed of glass fiber material impregnated with a suitable binder resin. Such a material is set forth in U.S. Pat. No. 3,046,718 to Frederick H. Ide and Robert C. Kimball. It has been found that a single layer of such glass fiber material will trap particles and bacteria down to the order of 0.3 microns. Thus, over 99% of the dust and dirt particles will be intercepted and impacted in the multi-layer filter dust bag 20. It will be evident from FIG. 4 that the outer and inner sheets 30 and 32 respectively are adhered to the intermediate layer of filter material 34 by means of adhesive.

It should be further noted that other types of fibrous filtering material may be substituted for the glass fiber batt 34, within the spirit and scope of the present invention. Moreover, it should be pointed out that the construction of the inner filter bag 20 with multi-layer filtering material insures the total filtration of the air discharged through said bag, and furthermore, since the filtering and dust-collecting elements of the bag are in a single unit, the same may be installed and removed from the outer dust bag simultaneously.

Another feature of the present invention is the construction of the outer and inner sheets 30 and 32 of air-pervious material, which may also be of different elasticity, so that the packing of the filter bag 20 is prevented.

It is preferred that the outer sheet 30 be of greater elasticity than the inner sheet 32, so that the intermediate fibrous filter material 34 is not crushed which would substantially reduce the effectiveness of the entire unit. Furthermore, it is preferable to have the outer sheet 30 of a higher porosity than the inner sheet 32 so that there is little air flow restriction. It should be mentioned that the thickness of the filter batt 34 may vary, and is dependent upon the desired effectiveness and length of filter life. Moreover, the inner sheet 32 of air-pervious material functions to trap or screen larger dirt particles, thus preventing the intermediate filter layer 34 from clogging permaturely.

Another desirable feature of the present hospital filter is that the noise levels of the vacuum cleaner employing the filter is considerably reduced, making it especially desirable for use in those facilities.

FIG. 5 shows, on an enlarged scale, a portion of the filter bag in which the outer layer 30 is more elastic than the inner layer 32. When air flows in the direction of the arrows through the inner layer 32 and the non-woven batt 34, the flow causes the outer layer 30 to stretch, thereby enlarging the openings therein, and consequently significantly reducing any air flow restriction that may be encountered in the flow path through the multi-layered filter bag.

It should thus be apparent that the overall air flow passing through the inner multi-layer filter bag, as well as the outer dust bag, will not impede the vacuum in the apparatus or reduce the efficiency of the vacuum cleaner. At the same time, the filter action of the dust bag is considerably improved.

What is claimed:

1. A multi-layer disposable filter bag for a vacuum cleaning apparatus used in hospitals or other health care facilities, said vacuum cleaning apparatus having an air discharge outlet, said filter bag comprising: at least two concentric and spaced air-pervious paper layers, a fibrous filter non-woven batt of glass fiber impregnated with a binder resin positioned in the space between said concentric layers, and an air-impervious connection from said filter bag to said discharge outlet whereby said discharged air flows in a path through the inner air-pervious layer, said fibrous filter non-woven batt and said outer air pervious layer.

2. A multi-layer filter as claimed in claim 1 wherein said outer air-pervious layer of said disposable filter bag has a higher porosity than said inner air-pervious layer thereof.

3. A multi-layer filter as claimed in claim 2 wherein the porosity of said concentric layers are such that the air flow impedance in said filter is minimized.

4. A multi-layer filter as claimed in claim 1 wherein said outer air-pervious layer of said disposable filter bag has a greater elasticity than said inner air-pervious layer thereof to substantially eliminated the crushing of said filter non-woven batt.

5. A multi-layer filter as claimed in claim 1 which is effective in reducing the sound level of a vacuum cleaner in operation.

6. In an upright vacuum cleaning apparatus for use in hospitals, health care facilities, and the like, said vacuum cleaning apparatus having a motor, fan and an air discharge outlet, the improvement comprising: an outer dust bag of perforated material having an openable closure, a multi-layer disposable paper inner filter bag insertable in said closure of the outer dust bag, said inner disposable filter bag having spaced concentric paper layers forming a space therebetween, a fibrous filter non-woven batt of a predetermined thickness in said space, said fibrous filter non-woven batt being a glass fiber impregnated with a binder resin, and air-impervious connection from said inner filter bag to said discharge outlet whereby said discharged air flows in a path through the inner air-pervious layer, said fibrous filter non-woven batt, and said outer air-pervious layer.

7. The combination as claimed in claim 6 wherein said outer dust bag is fabricated from a perforated vinyl or cloth material.

8. A multi-layer filter as claimed in claim 1 wherein said inner filter bag performs both the filtering and dirt collection functions of said vacuum cleaning apparatus.

9. A multi-layer filter as claimed in claim 8 which is disposable after dirt collection capacity has been reached.

* * * * *